United States Patent
Eble

(10) Patent No.: US 9,791,594 B2
(45) Date of Patent: Oct. 17, 2017

(54) LIGHT GRID WITH DETECTION BY ADJACENT LIGHT RECEPTION UNITS ARRANGED OPPOSITE LIGHT TRANSMISSION UNITS

(71) Applicant: SICK AG, Waldkirch (DE)

(72) Inventor: Johannes Eble, Waldkirch (DE)

(73) Assignee: SICK AG, Waldkrich (DE)

( * ) Notice: Subject to any disclaimer, the term of this patent is extended or adjusted under 35 U.S.C. 154(b) by 0 days.

(21) Appl. No.: 14/521,532

(22) Filed: Oct. 23, 2014

(65) Prior Publication Data
US 2015/0144772 A1 May 28, 2015

(30) Foreign Application Priority Data
Nov. 25, 2013 (EP) .................................. 13194307

(51) Int. Cl.
*G01V 8/20* (2006.01)
(52) U.S. Cl.
CPC ..................... *G01V 8/20* (2013.01)
(58) Field of Classification Search
CPC .............. G01V 8/10; G01V 8/20; G06M 7/00
USPC ........................ 250/216, 221, 239; 340/556
See application file for complete search history.

(56) References Cited

U.S. PATENT DOCUMENTS

| 6,348,696 B1 | 2/2002 | Alt et al. |
| 2006/0278817 A1* | 12/2006 | Pirkl ................... G01V 8/20 250/221 |
| 2009/0244551 A1 | 10/2009 | Lutz |

FOREIGN PATENT DOCUMENTS

| EP | 2492714 A1 | 8/2012 |
| JP | 2010-060298 A1 | 3/2010 |

OTHER PUBLICATIONS

European Search Report dated May 8, 2014 of corresponding EP priority application No. 13194307.8.

* cited by examiner

*Primary Examiner* — Georgia Y Epps
*Assistant Examiner* — Don Williams
(74) *Attorney, Agent, or Firm* — Nath, Goldberg & Meyer; Jerald L. Meyer; Stanley N. Protigal

(57) ABSTRACT

The invention relates to a light grid having divergent light beams so that cross-beams can also be evaluated beside parallel beams, wherein not only a light beam interruption, but also the intensity of the light incidence on a light reception unit is evaluated. To provide an improved light grid with which in particular smaller objects can be detected and possibly also located, it is proposed that the light transmission units have a transmission optics in whose focus an extended light source is arranged. Furthermore, each beam contains an effective beam, with an effective beam being defined in that a part shading of this effective beam effects a measurable intensity change in the associated light receiver corresponding to the shading. Finally, the effective beams define at least one detection zone in the monitored plane, with an illumination by at least one effective beam being present in the total detection zone.

3 Claims, 7 Drawing Sheets

Figure 1:
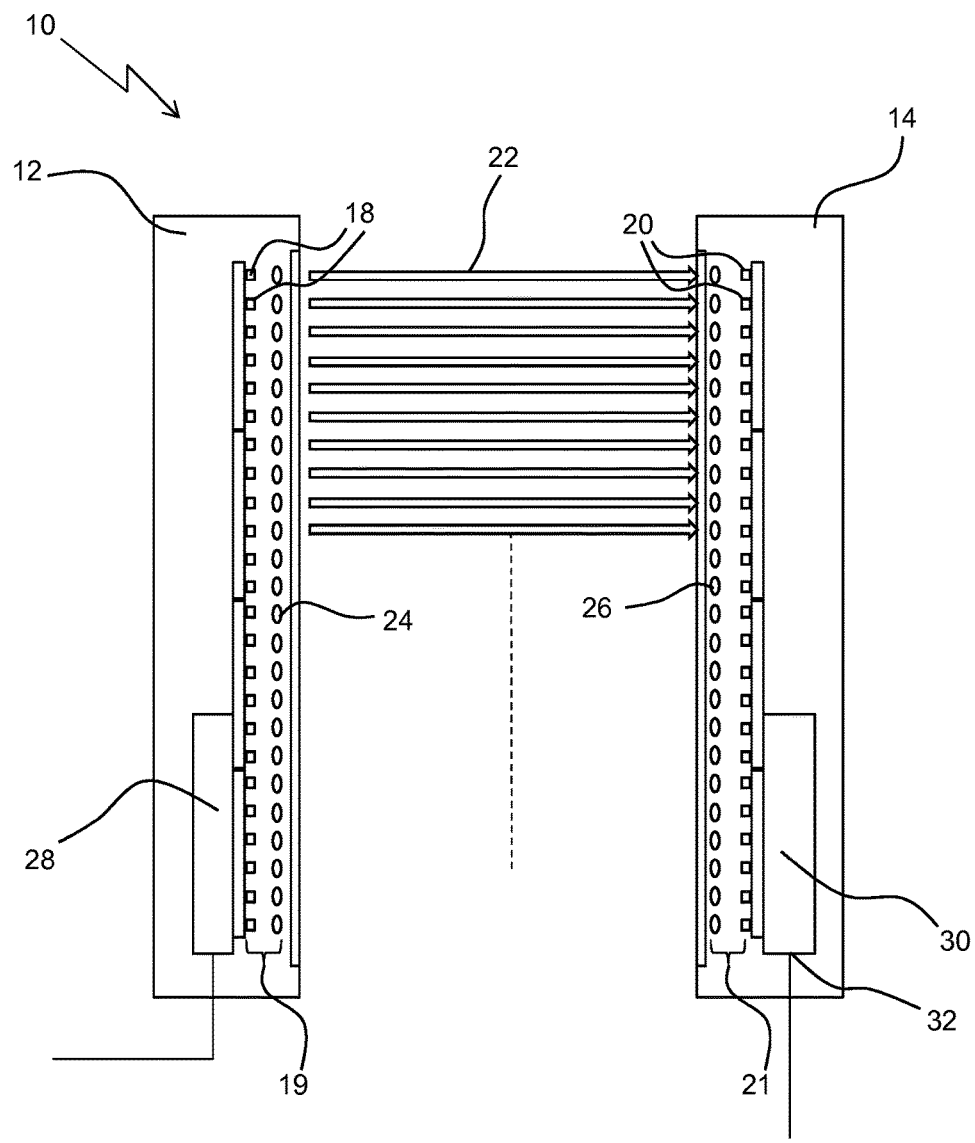

LIGHT GRID WITH DETECTION BY ADJACENT LIGHT RECEPTION UNITS ARRANGED OPPOSITE LIGHT TRANSMISSION UNITS

The invention relates to a light grid having a plurality of light transmission units arranged in a row and having light reception units which are arranged in a row opposite them and which deliver reception signals in accordance with the light incidence between which a monitored plane lies which is defined by beams between the light transmission units and the light reception units, wherein a beam is defined in that it comprises those light beams which emanate from an activated light transmission unit and are detected by a simultaneously activated light reception unit, wherein the light of each light transmission unit is divergent and also irradiates over at least the next adjacent reception unit beside the oppositely disposed light reception unit for the formation of cross-beams and having a control and evaluation unit for controlling the light transmission units and the light reception units and for evaluating the light intensity of the light incidence on a light reception unit.

Such a light grid is known form EP 2 492 714 A1.

A light grid is known from U.S. 2006/278817 A1 in which cross-beams are also generated in addition to parallel light beams to measure objects. The use of cross-beams is also known from U.S. 2009/0244551.

Starting from this prior art, it is the object of the invention to provide an improved light grid with which in particular smaller objects can be detected and possibly also localized.

This object is satisfied by a light grid having the features of claim 1.

The light grid comprises a plurality of light transmission units arranged in a row and light reception units which are arranged in a row opposite them and which deliver reception signals in accordance with the light incidence. A monitored plane is thus defined between the light transmission units and the light reception units, and indeed by beams, where a beam is defined in that it comprises those light beams which emanate from an activated light transmission unit and which are detected by a simultaneously activated light reception unit. The light of each light transmission unit is divergent so that each light transmission unit also irradiates over at least the next adjacent reception unit beside the directly oppositely disposed light reception unit for the formation of first order cross-beams. The light grid furthermore has a control and evaluation unit for controlling the light transmission units and the light reception units and for evaluating the intensity of the light incidence on a light reception unit. In accordance with the invention, each beam contains an effective beam, with an effective beam being defined in that a part shading of this effective beam effects a measurable intensity change in the associated light receiver corresponding to the shading. Finally, the effective beams define at least one detection zone in the monitored plane, with an illumination by at least one effective beam being present in the total detection zone.

The major advantage of the invention is that the light grid has a substantially higher resolution. The resolution was previously limited by at least the spacing of two parallel light beams. Substantially smaller objects than was previously possible can be detected in the defined detection zone using the light grid in accordance with the invention. For there is a complete illumination in this detection zone, and indeed by the effective beams. This means that the detection zone is gap-free and objects are already recognized when they have a minimum size which corresponds to the part shading of an effective beam which can just still be detected by a light receiver. That is substantially smaller than with known light grids in which the minimum size primarily results from the spacing of two parallel light beams. Details and numerical examples thereon will follow in the detailed description of the Figures.

In a further development of the invention, the light transmission units have a transmission optics in whose focus an extended light source is arranged. Furthermore, each beam contains an effective beam, wherein it has proved advantageous to obtain a defined light source if the light source is formed as a diaphragm illuminated by a light transmission element, for example an LED, such as is generally known from today's light grids. Alternatively, a commercially available LED would also be able to be easily realized as a light source in which then the transmission optics is integrated in the LED component.

In a simple embodiment and to generate a defined irradiation angle and to achieve a greater range, provision is made in a further development of the invention that the transmission optics has a transmission lens.

It is furthermore advantageous if the transmission optics is configured such that the cross-section of the transmitted light of a light transmission unit is approximately rectangular. An advantageous approximately linear relationship then results between the part shading of an effective beam and the received signal of the corresponding light receiver.

So that all the light that is incident on the reception aperture also arrives in the light receiver and can be detected, provision is furthermore made that the light reception unit has a reception optics having a reception lens.

In addition to the increase in resolution, a positional determination can also be possible of an object in the monitored plane by the light grid in accordance with the invention. To make this possible, the light of a light transmission unit also irradiates over the next but one adjacent reception unit beside the oppositely disposed light reception unit and the next adjacent light reception unit. Second order cross-beams are thus formed.

If the detection zones are formed by the intersection zones of the beams of different orders, that is, for example, by the intersection zone of a parallel effective beam with an effective first order cross-beam and/or of an effective first order cross-beam with a second order one, then positional determinations of objects are possible in these detection zones.

This positional determination can, for example, advantageously be used in the height detection of objects in the monitored plane, e.g. to determine the height of parallelepiped-shaped packages when being transported past light grids in accordance with the invention standing perpendicular.

Figure 2:
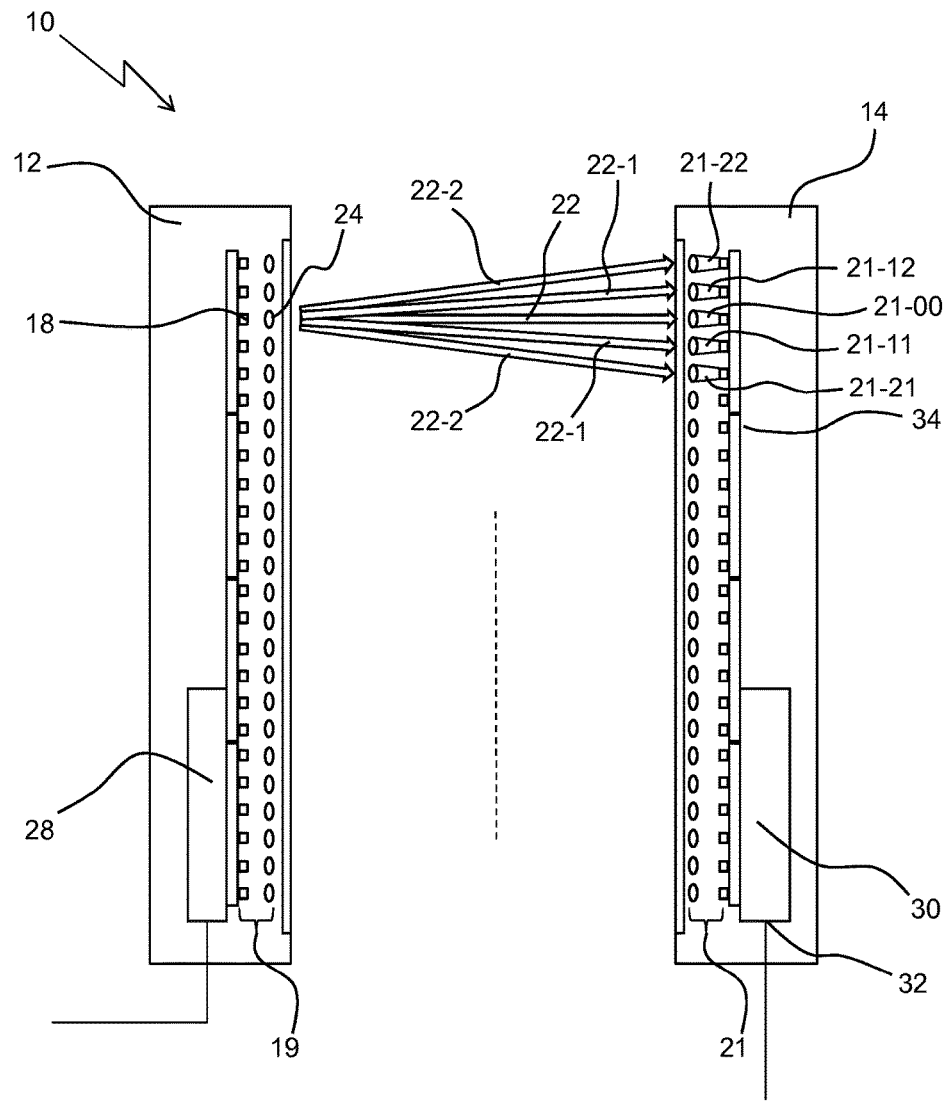
Figure 3:
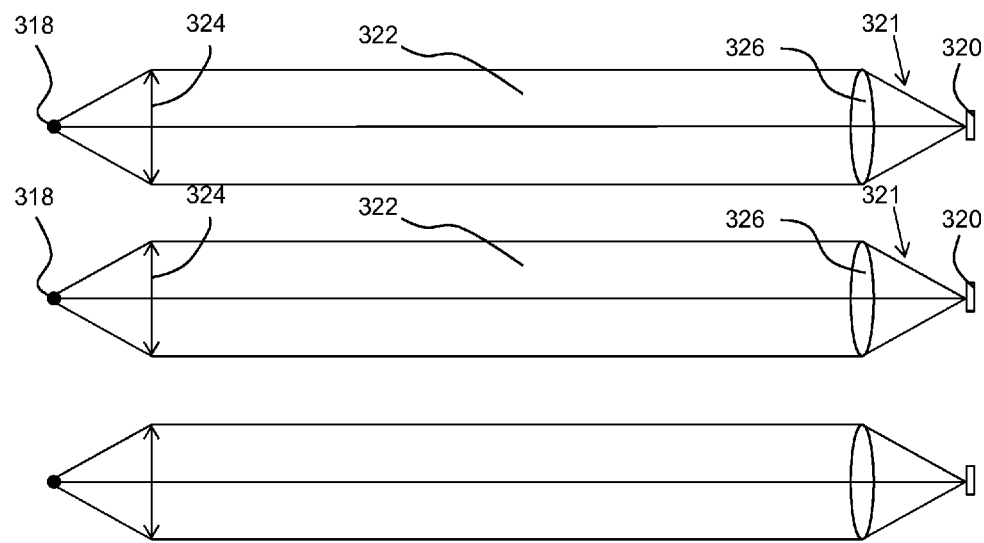
Figure 4:
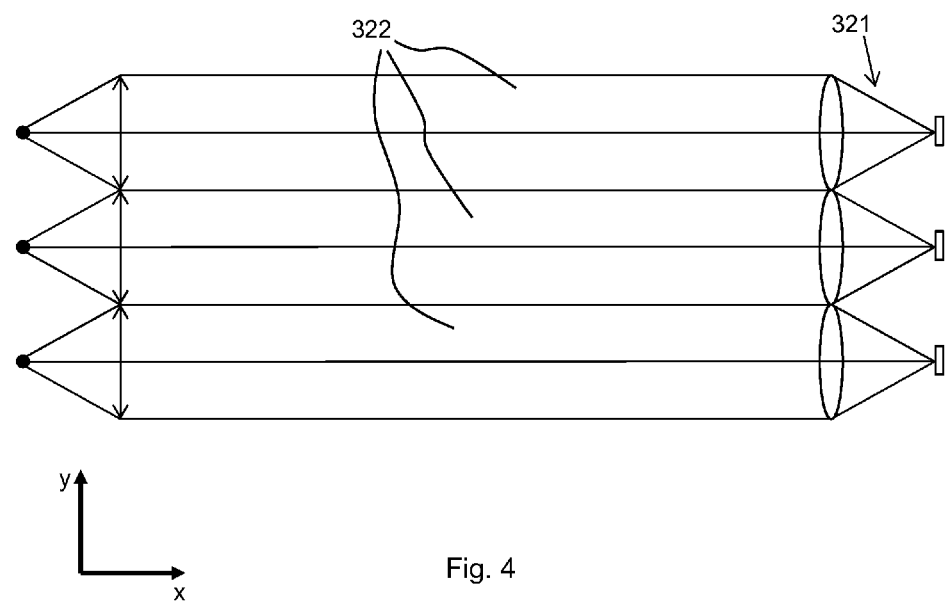
Figure 5:
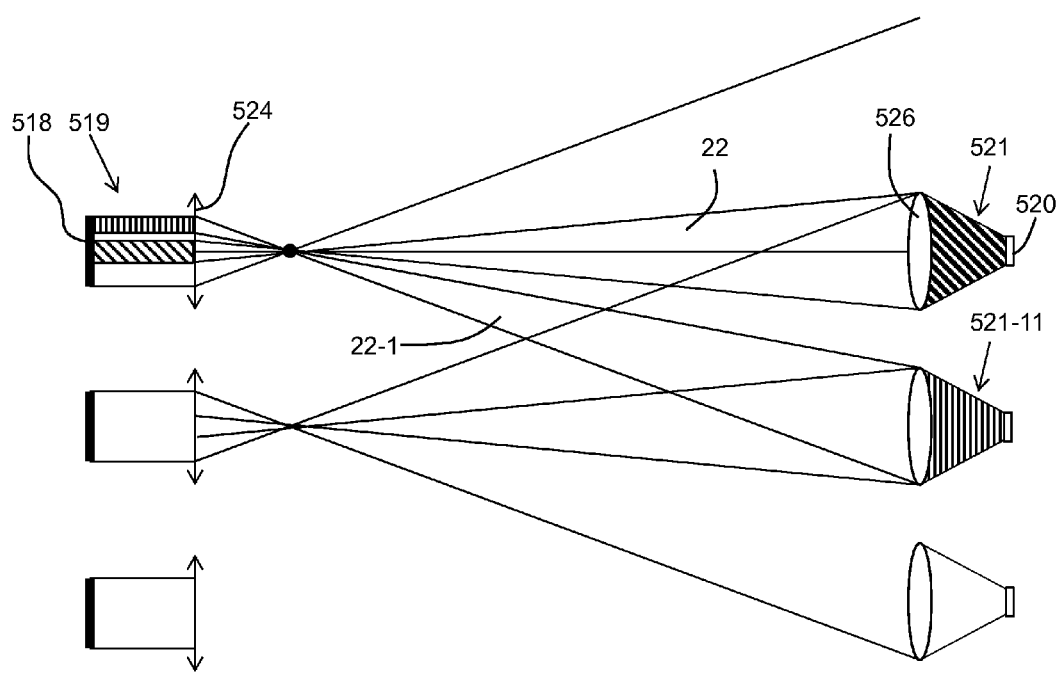
Figure 6:
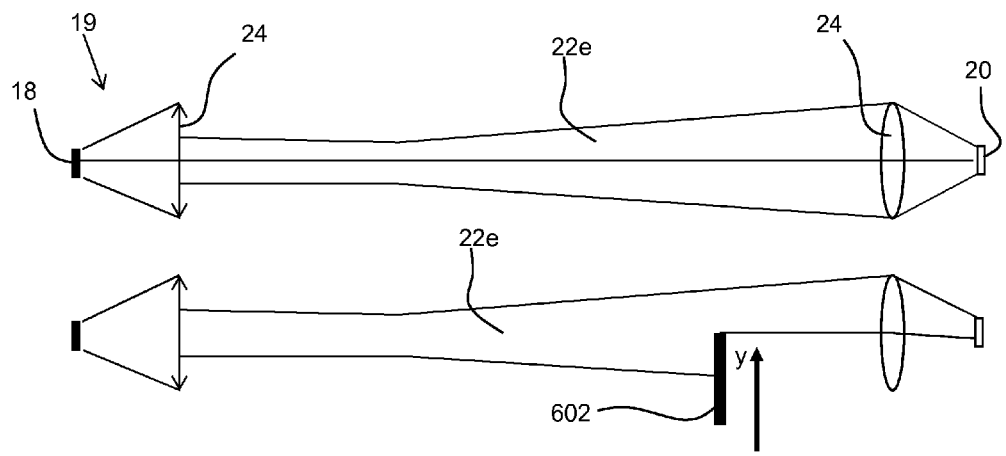
Figure 6:
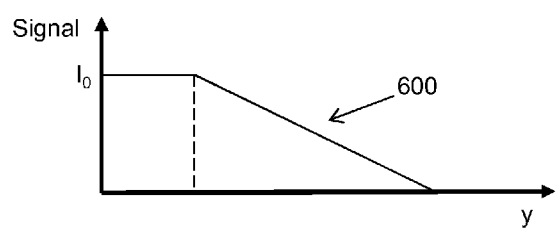
Figure 6:
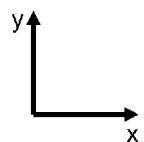
Figure 7:
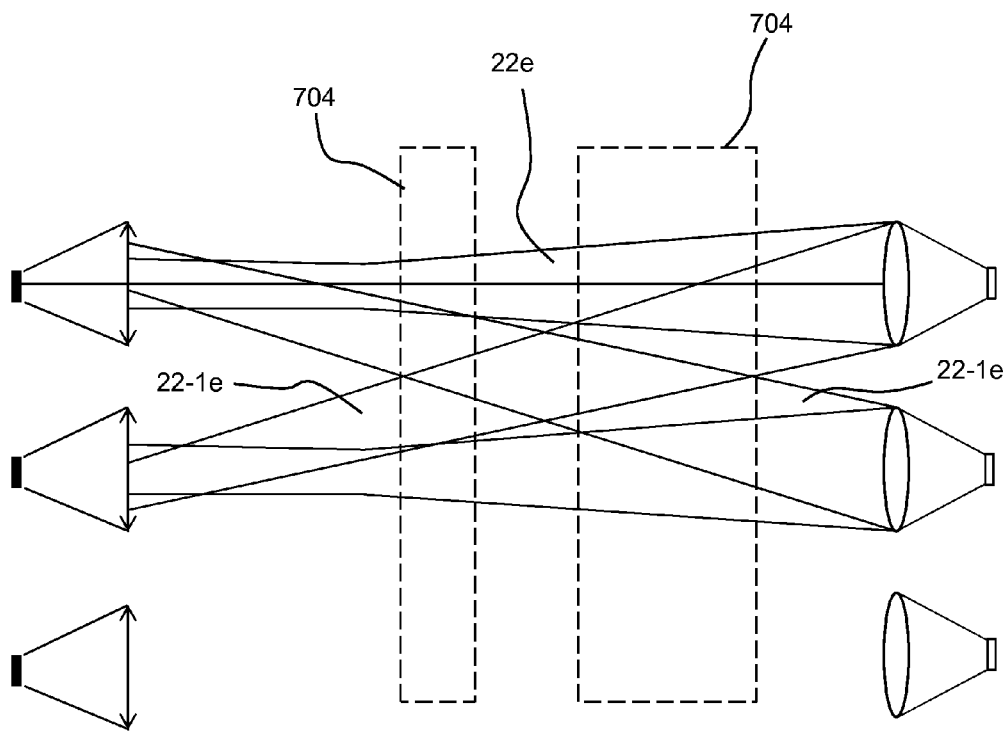
Figure 7:
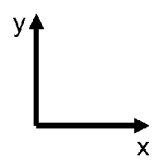
Figure 8:
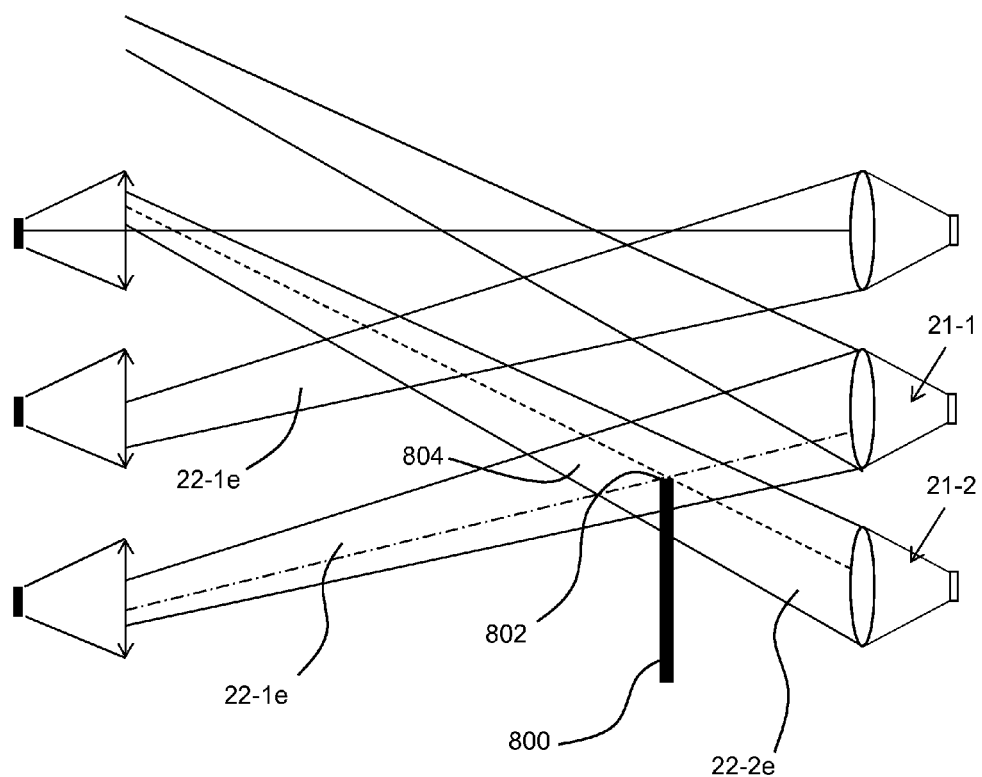
Figure 8:
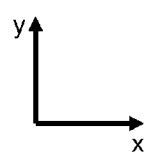

The invention will be explained in detail in the following with reference to embodiments and to the drawing. There are shown in the drawing:

FIG. 1 a schematic representation of a light grid in accordance with the invention;

FIG. 2 a schematic representation of a light grid in accordance with the invention;

FIGS. 3 and 4 schematic representations of idealized light grids in accordance with the prior art with parallel transmitted light;

FIG. 5 a schematic representation of a further idealized light grid with divergent transmitted light;

FIG. 6 a schematic representation of components of the light grid in accordance with the invention for illustrating the optical path;

FIG. 7 a schematic representation like FIG. 5 for illustrating the optical path with first order cross-beams;

FIG. 8 a schematic representation like FIGS. 5 and 7 for illustrating the optical path with first and second order cross-beams.

A light grid 10 in accordance with the invention has a transmitter housing 12 and a receiver housing 14 which respectively have, on the one hand, a row of light transmitters 18 arranged in the longitudinal direction (in the following also the y direction) and a row of receivers 20 arranged in the longitudinal direction. A receiver 20 is arranged disposed opposite every light transmitter 18 so that respective beams, which are symbolized in simplified form as arrows 22 in this representation, are disposed between transmitter/receiver pairs. A transmission optics 24, which forms the transmitted light beam 22, is arranged in front of each light transmitter 18. The light transmitter 18 and the transmission optics 24 form a light transmission unit 19. A reception optics 26 is arranged in front of each light receiver 20 so that the light that is incident on the reception optics 26 also arrives on the light receiver 20. The light receiver 20 and the reception optics 26 form a light reception unit 21.

The light beams 22 define in their totality a monitored plane which is monitored as to whether one or more of the light beams 22 are fully or partly interrupted by an object, not shown. Such an interruption is evaluated in receiver electronics 30 and a corresponding signal is output at an output 32. The output signal can be a simple switch signal ("object in protected field Yes/No") or a signal having more information, e.g. where the object is located. Control electronics 28 for controlling the light transmitters 18 are provided at the transmitter side.

The transmitters 18 and the light receivers 20 have a uniform spacing A with respect to one another in their row, said spacing also being called a grid dimension. A light receiver is disposed opposite each light transmitter. The association of an activated light transmitter 18 with an activated light receiver takes place by the control unit 28 and by the control and evaluation unit 30, which are synchronized with one another.

If exactly oppositely disposed transmitters/receivers are activated at the same times, the monitored plane is composed of the parallel beams 22 shown schematically in FIG. 1. In this respect, in a known manner, not all transmitters 18 are activated at the same time, but the transmitters 18 and associated receivers 20 are switched through (activated) cyclically in a fast sequence so that always only one transmitter/receiver pair, and thus one beam, is activated. The cycle frequency is very high so that objects which move through the monitored plane or are conveyed through the plane are quasi-stationary.

Furthermore, the light grid 10 in accordance with the invention provides that so-called cross-beams can also be activated. They result when an activated light transmitter 18 does not have the exactly oppositely disposed receiver 20 associated with it (activated), but rather its adjacent receiver. Such cross-beams are shown schematically in FIG. 2 and will be explained with reference to this Figure.

The transmitter 18 (the third from above as an example in FIG. 2) transmits transmitted light that is expanded by the transmission optics 24 such that it not only irradiates over the oppositely disposed reception unit 21-00, but also over the respective next adjacent units 21-11 and 21-12 and also over the next-but-one neighbors 21-21 and 21-22. If now the transmitter 18 and the reception unit 21-00 are activated at the same time by the control units 28 and 24, the "parallel" beam 22 results, as shown in FIG. 1. If now the transmitter 18 and the reception unit 21-11 and 21-12 respectively are activated at the same time, cross-beams 22-1 result which will be called first order cross-beams in the following to make clear that, starting from a transmitter 18, they are incident on the next adjacent reception unit 21-11 or 21-12 respectively. In an analog manner, second order cross-beams 22-2 are formed between the transmitter 18 and the next-but-one neighbor 21-21 or 21-22 respectively. In summary, beams always result between transmitters and receivers activated at the same time. If they are exactly oppositely disposed, they will be called "parallel beams" in the following; if they are not exactly oppositely disposed, the beams which are then formed will be called "cross-beams".

The formation of such cross-beams in a light grid is known. The new feature of this invention is the specific configuration of the light beams, their generation and their evaluation. However, to understand this better, some hypothetical, idealized arrangements will first be looked at.

FIG. 3 shows an ideal arrangement for a light grid. In this respect, point-shaped transmitted light sources 318 are provided which are ideal Lambert radiators and are in the focus of a converging lens 324. This means that the light of the beams 322 is exactly parallel and the total transmitted light is incident onto an oppositely disposed reception unit 321 comprising a reception optics 326 and a receiver 320 and is focused on the receiver 320 by the reception optics 326. The resolution of such a light grid would result from the spacing of two parallel beams 322 plus the size of a part shading which a reception unit 321 could just still detect.

If now the transmitter/receiver arrangements are brought so close to one another that the parallel beams 322 contact one another, as shown in FIG. 4, a protected field without gaps would have theoretically been created and every object could be detected since an object brings about a shading at every point in the monitored plane which would theoretically be detectable in one of the reception units 321. The resolution in this case would only be limited by the size of the shading which a reception unit 321 could still detect.

This is admittedly desirable, but is not feasible in reality for many reasons: The most important reasons are: 1) There are no ideal Lambert spotlights; 2) An adjustment of the optical components with respect to one another and of the transmitters with respect to the receivers, that is of the transmitter housings with respect to the receiver housings, is practically not feasible. 3) Such a tight arrangement in which the parallel light beams adjoin one another without a gap is much too expensive. This theoretical arrangement cannot be realized overall.

In reality, there are no parallel transmitted beams with absolutely parallel light. Essentially, there is always divergent transmitted light which is also required for the adjustment of the transmitter housings and receiver housings with respect to one another. Such divergent light can be produced in a theoretical arrangement in accordance with FIG. 5. This arrangement already contains a part of the light grid 10 in accordance with the invention as will become even clearer in the following. In this theoretical example, a light transmission unit 519 comprises a light source 518 which has an extent in the y direction (longitudinal direction of the light grid) and generates absolutely parallel light in the monitored plane. This parallel light is incident onto a converging lens 524 of the transmission unit 519 which collects the parallel light in the focus so that it is finally irradiated in a divergent manner and in so doing irradiates over the oppositely disposed reception units 521. In this example, the respective next neighbors 521-11 of the exactly oppositely disposed reception optics 531 are still just hit. The reception optics 526 of the reception units 521 are configured such that they always focus the light onto the downstream receiver 520 so that the light that is incident on the reception optics 526 is also detected.

In this ideal arrangement, a portion of the transmitted light, namely only that shown obliquely hatched, is incident onto the exactly oppositely disposed reception unit for the formation of the above-defined "parallel" light beams 22. Whereas another portion, namely the one with perpendicular hatching, is incident onto the next adjacent receiver. This "light with perpendicular hatching" corresponds to the above-defined first order cross-beams which had the reference numeral 22-1.

Now reality, and thus the light grid 10 in accordance with the invention, should be looked at. FIG. 6 should be of aid here. The light source 18, which extends in the y direction and irradiates transmitted light, is located in the focus of the transmission optics 24 of the transmission unit 19 in the light grid in accordance with the invention. The transmitted light has portions of parallel light and also divergent portions so that the total transmission optics 24 is also illuminated.

The portion of the transmitted light which irradiates onto the exactly oppositely disposed reception unit 21 and is detected by it forms the "parallel" light beam 22. The invention now furthermore starts from these beams theoretically defined in this manner, but not just therefrom, but rather defines so-called "effective" beams which will be explained with reference to FIG. 6. An effective beam 22e is defined in that a part shading of the beam effects a corresponding and measurable intensity change in the associated light receiver 20. This can be recognized very simply with reference to the diagram 600 in FIG. 6. If an object 602 is pushed into the optical path and effects a shading in the y direction, a reduction in the reception signal, which is defined as 100% with a free optical path, takes place which corresponds to the penetration depth y. The 100% signal has to be taught in a teaching process for all beams, parallel beams and cross-beams, and for every mechanical setup, that is for every transmitter/receiver spacing. The reception signal falls to zero when the object 602 completely covers the effective beam 22e. It must be noted that an approximately linear development, such as is shown in FIG. 6, only results when the effective beam 22e substantially has a rectangular cross-section. On a use of circular reception optics and transmission optics, the effective beam 22e has a round cross-section and the dependence would no longer be linear, but would still be clear.

These observations also depend on the sensitivity of the receiver 20 used. However, typical, realistic values can be assumed, which means that a receiver can register a signal drop of 100%.

If such a sampling of the effective parallel beam 22e is made at different x values, that is at different spacings from the transmission unit 19, the total effective parallel beam 22e is ultimately obtained. In the theoretical, ideal case of FIG. 3, the effective parallel beam has an unchanged cross-section over the total path. In the case of FIG. 5, the cross-section has a constriction in the focus of the transmission lens 524 with ideal, divergent transmitted light. In the case in accordance with the invention with an extended light source 18 in the focus of the transmission lens 24, the effective parallel beam 22e has a cross-section such as is shown in a qualitative manner in FIG. 6. Since there are portions of parallel light and of divergent light with the extended light source 18, the arising effective parallel light beam 22e is a mixture of the different portions and can only be determined by measurement. FIG. 6 shows the rough qualitative extent.

In this manner, "effective" cross-beams 22-1e are now also defined which have the same qualitative appearance as shown in FIG. 7.

If now the effective parallel beams 22e and also the effective cross-beams 22-1e are evaluated, the substantial advantages of the invention result.

This will first be explained in a qualitative manner with reference to FIG. 7. First, the effective beams are defined such that a part shading can be detected as a signal change in the receiver. A high resolution can therefore be achieved in the regions which are detected (covered) by effective beams 22e and 22-1e; the resolution corresponds to the minimum magnitude which effects a detectable signal change (typically 10% signal drop). They are the regions marked by dashed lines in FIG. 7. A complete illumination is present there by effective beams, namely effective parallel beams 22e or effective first order cross-beams 22-1e. These region are thus detection zones 704 in the sense of the invention.

On the use of typical dimensions for the grid spacing and sizes of the optics, the resolution can be improved by a factor of 20. This higher resolution, however, only applies in the detection zones 704. If only they are to be utilized, it must be ensured that objects to be detected are also only present in the corresponding regions in the x direction.

In a further embodiment of the invention, beside the effective first order cross-beams 22-1e, the effective second order cross-beams 22-2 (FIG. 2) are additionally utilized which are defined in an analog manner to the other effective beams. Such effective first order cross-beams 22-1e and effective second order cross-beams 22-2e are shown in a qualitative manner in FIG. 8. These effective cross-beams 22-1e and 22-2e can now be utilized to determine an exact positional indication of, for example, an object edge 802 of an object 800.

Such a positional determination is in principle not only possible in the intersection zone 804 of the effective first order cross beams and of the effective second order cross-beams, but always wherever two effective cross-beams of different orders overlap, e.g. parallel beams with first or second order beams or first order with second order beams. The dashed lines and the chain-dotted lines indicate which portion of the light of the cross-beams is incident onto the reception units 21-1 and 21-2. A specific combination of intensities at the reception units corresponds to an x-y position in the intersection zone 804. These combinations have to be stored in a look-up table beforehand in a teaching phase. The determination of the values of the look-up table can take place either experimentally or also by means of simulation. The upper object edge 802 and thus the height of the object 800 can thus therefore be determined. Furthermore, the position of the object between the transmitter housing and the receiver housing can be determined. The thickness of an object could equally be determined in that both the position of the upper edge and the position of a lower edge is determined using this method. For this purpose, the object naturally has to be completely located in the light grid. A conceivable use for measuring an object size/object thickness in this manner could be an application in which the object to be measured is incident through a horizontally orientated monitored plane of the light grid in accordance with the invention.

In the actual use of the light grid in accordance with the invention, the detection zone in which the described positional determination is possible is composed of the intersection zones described individually above, that is substantially of the intersection zones shown in FIGS. 7 and 8.

These intersection zones are not shown in a common Figure since such a Figure would be completely unclear.

Further alternatives are conceivable in further embodiments, not shown, of the invention.

It would in principle be conceivable to provide an arrangement in which a reflector is arranged opposite the transmitters which reflects the beams on receivers which are arranged next to the transmitters and which are arranged in the same housing. The object to be detected or to be measured is then located between the transmitter and the receiver and the reflector strip.

The increase in resolution was shown for the example of a few transmission channels and reception channels. An extension to whole transmitter and receiver arrays is conceivable.

An extension to three dimensions would thus also be possible, that is if not only a row of transmitters and a row of receivers is provided, but rather a plurality of transmitters and receivers arranged in parallel.

It would also be conceivable to take account of higher order cross-beams, whereby e.g. the detection zone would be enlarged.

The invention claimed is:

1. A method to use a light grid, comprising
    arranging a plurality of light transmission units in a row,
    arranging light reception units opposite the plurality of light transmission units in a row and delivering by the light reception units received signals corresponding to light incidence,
    using beams between the light transmission units and light reception units to define a monitored plane between the plurality of light transmission units and light reception units, wherein a beam comprises those light beams which emanate from an activated light transmission unit and are detected by a light reception unit activated at the same time, wherein the light of each light transmission unit is divergent and also irradiates over at least the next adjacent reception unit beside the oppositely disposed light reception unit for the formation of cross-beams of first order,
    wherein the order corresponds to a relative position of the light transmission units and light reception units with respect to that of oppositely disposed reception units;
    controlling the light transmission units and light reception units by a control and evaluation unit and evaluating the intensity of the light incidence on a light reception unit by the control and evaluation unit,
    wherein the beams or cross-beams are effective beams or effective cross-beams, an effective beam defined in that a part shading of this effective beam effects a measurable intensity change in the associated light receiver corresponding to the shading at each spacing from the light transmission unit, and
    wherein the monitored plane comprises at least one detection zone having a gap-free illumination present in the total detection zone due to the effective beams and the effective cross-beams, the effective beams defining at least one detection zone in the monitored plane, with an illumination by at least one of the effective beams present in the total detection zone, wherein a relationship then results between the part shading of an effective beam and the received signal of the corresponding light receiver; and
    determining at least one of the height and the position of objects within the detection zone when the objects are conveyed through the monitored plane based on a positional determination provided by an intersection zone in which effective cross-beams of different orders overlap.

2. The method in accordance with claim 1, wherein the light of a light transmission unit also detects the next-but-one adjacent reception unit beside the oppositely disposed light reception unit and the next adjacent light reception unit for the formation of second order cross-beams.

3. The method in accordance with claim 1, wherein intersection zones of the beams of different orders form the detection zone.

* * * * *